United States Patent
Bayne et al.

[15] 3,697,550
[45] Oct. 10, 1972

[54] VAPOUR PHASE OXIDATION OF BENZENE TO MALEIC ANHYDRIDE USING AN ALUMINUM PHOSPHATE SUPPORTED CATALYST

[72] Inventors: John Bayne; Ian Robert King; John Richard Morey, all of Luton, England

[73] Assignee: Laporte Industries Limited, London, England

[22] Filed: Dec. 17, 1970

[21] Appl. No.: 99,315

[30] Foreign Application Priority Data

Dec. 19, 1969   Great Britain..........61,900/69

[52] U.S. Cl. ................260/346.8, 252/435, 252/437
[51] Int. Cl...............................................C07c 57/14
[58] Field of Search.........260/346.8 X; 252/435, 437

[56] References Cited

UNITED STATES PATENTS 2,967,185   1/1961   Becker et al............260/346.8

Primary Examiner—Alex Mazel
Assistant Examiner—Bernard Dentz
Attorney—Jacobs & Jacobs

[57] ABSTRACT

This invention relates to the use of a support of aluminium phosphate in the cristobalite form in a process for the vapor phase oxidation of benzene to maleic anhydride in which a gaseous mixture containing benzene and oxygen with an inert diluent gas is contacted at a temperature in the range of 350° to 450° C with the supported catalyst, whose catalyst component, present to the extent of between 5 and 30 percent by weight in the supported catalyst, comprises two or more of vanadium oxide, molybdenum oxide, tungsten oxide and phosphorus oxide.

10 Claims, No Drawings

VAPOUR PHASE OXIDATION OF BENZENE TO MALEIC ANHYDRIDE USING AN ALUMINUM PHOSPHATE SUPPORTED CATALYST

This invention relates to a supported catalyst, to a process of preparing the supported catalyst and to the use of such supported catalyst in a process for the preparation of maleic anhydride by the catalytic vapor phase oxidation of benzene.

According to the present invention there is provided a supported catalyst comprising a catalyst component suitable for the vapor phase oxidation of benzene to maleic anhydride and supported on aluminum phosphate in the cristobalite form.

The cristobalite form of aluminum phosphate may be obtained by heating the normal berlinite form of aluminum phosphate at an elevated temperature which is preferably in excess of 1,000° C, most preferably within the range of from 1,100° to 1,300° C. If desired, temperatures of somewhat less than 1,000° C may be employed. Thus, we have effected transition of the berlinite form to cristobalite form at a temperature of 900° C. Preferably, the berlinite aluminum phosphate is heated at the elevated temperature for a period of time sufficiently long to effect substantially complete transition to the cristobalite form, but total transition is not necessary. Transition from one form to the other can be readily followed by X-Ray powder diffraction analysis. The X-Ray powder diffraction lines of the cristobalite form of aluminum phosphate, as given below, at 25° C and with copper $K\alpha$ radiation, distinguish it from any other form of aluminum phosphate.

| $\alpha(A.)$ | 4.08 | 2.51 | 3.16 | 5.01 |
|---|---|---|---|---|
| Intensity ratio | 100 (standard) | 20 | 10 | 1 |

It is found that at 1,100° to 1,300°, a suitable period of time for effecting complete transition is 10 to 20 hours. The berlinite starting material may be commercially available berlinite aluminum phosphate or, alternatively, may be prepared by suitably treating activated alumina with phosphoric acid. When the berlinite is prepared from alumina, the alumina should be of relatively small particle size, advantageously of particle size less than about 150 BSS mesh and preferably slurried with water prior to addition of the appropriate amount of phosphoric acid. After the reaction has subsided the pasty mass is heated at 200° C, reduced to a convenient size and calcined. Where alumina outside the preferred particle size range is employed, the resulting cristobalite support may contain a small amount, probably less than 10 percent by weight, of alumina but this impurity has has not been found to unduly affect the catalytic properties of the supported catalyst prepared from this support. Using alumina of the preferred particle size, that is less than 150 BSS mesh, and slurrying this in water, no alumina was detected in the prepared support.

The catalyst components of the supported catalyst may suitably be one or more of molybdenum oxide, vanadium oxide and tungsten oxide, desirably in combination with phosphorus oxide. Preferred catalyst components are those containing one or both molybdenum oxide and vanadium oxide, again desirably in combination with phosphorus oxide.

When both molybdenum oxide and vanadium oxide are present in the catalyst component, the relative proportions of these oxides may lie within wide limits. Desirably, however, the weight ratio of these oxides expressed as $MoO_3:V_2O_5$ lies within the range of from 1:3 to 4:1 and is preferably about 2:1. The weight ratio of $(MoO_3 + V_2O_5):P_2O_5$ where all three oxides are present is desirably greater than 1:1 and preferably within the range of from 2:1 to 50:1.

The weight percentage of the catalyst component, calculated as oxides, present in the supported catalyst may conveniently lie within the range of from 5 to 30 preferably within the range from 10 to 20 percent.

The supported catalyst is normally prepared by impregnating the aluminum phosphate in the following way:

i. forming a suspension or slurry of the phosphate in an aqueous solution comprising the catalyst component,
ii. drying the impregnated support,
iii. calcining or activating the impregnated support at a temperature of 400° C or above. In a preferred method of preparing the supported catalyst, the desired amount of the required oxides or hydrated oxides selected from molybdenum oxide, vanadium oxide and tungsten oxide is dissolved in an aqueous solution of oxalic acid and the resulting solution applied to the cristobalite aluminum phosphate support. The aqueous solution of oxalic acid preferably contains on a weight basis 10 to 50 percent, most preferably 25 to 40 percent, of oxalic acid. When the supported catalyst is also required to contain phosphorus oxide a suitable source of phosphorus oxide for example phosphoric acid, may be added to the solution of the other oxides at any convenient stage in the preparation of that solution or alternatively the source of phosphorus oxide may be molybdophosphoric or tungstophosphoric acid. The amount of oxalic acid solution employed is preferably that containing an excess of oxalic acid over that needed to converts the oxides to the corresponding oxalates. Although it is preferred to use the oxalates as above described, any other salts which will decompose to the oxide may be used.

The supported catalyst of the invention is particularly suitable for use as a fluidized-bed catalyst. It is not necessary that the particle size of the cristobalite aluminum phosphate support used in preparing the supported catalyst be such as to give a supported catalyst having the required particle size for a particular fluid-bed system as the supported catalyst is preferably suitably ground after preparation.

The present invention further provides a process for the preparation of maleic anhydride which comprises contacting a gaseous mixture, at elevated temperature, comprising benzene and oxygen with a supported catalyst as hereinbefore set forth and subsequently separating maleic anhydride from the unreacted starting materials and any by-products formed.

Preferably the gaseous mixture contains one or more diluent gases which are inert to the reactants and products such as nitrogen, argon, carbon dioxide, carbon monoxide and steam. Conveniently air may be employed as the source of both oxygen and the diluent gases. It is desirable though not essential if suitable precautions are taken, to use mixtures containing benzene in concentrations outside the explosion limits. In the case of benzene-air mixtures, a mixture containing more than about 8 percent v/v of benzene is considered desirable.

The elevated temperature suitably lies within the range of from 250° to 550° C, preferably within the range of from 350° to 450° C. The contact time between the gaseous mixture and the supported catalyst may be up to about 10 seconds but is desirably from 3.5 to 6.5 seconds.

For a particular catalyst the reaction temperature and contact time are chosen to give, for a desired conversion rate, the optimum yield of maleic anhydride. Generally the conversion to oxidation products increases with temperature but at too high a temperature the selective production of maleic anhydride decreases.

Maleic anhydride may be separated from the product mixture issuing from the reaction zone by scrubbing the mixture with benzene. Maleic anhydride, substantially free from water, may be obtained by contacting the product mixture with benzene under reflux conditions so that maleic anhydride is dissolved and separated by the descending liquid reflux and water present in the product mixture is entrained in the ascending benzene vapor. The mixture of benzene and water may then be separated in known manner so that at least part of the benzene may be recycled. Since the solution of maleic anhydride obtained is substantially free from water, hydrolysis of maleic anhydride to maleic acid and subsequent formation of fumaric acid is avoided. Maleic anhydride may be separated from the benzene solvent by any suitable method and the benzene recycled. The benzene recycle may be either to the reaction or separation stages.

The invention will now be illustrated by way of the following examples:

EXAMPLE 1

This example illustrates the preparation of a supported catalyst, designated catalyst A, in accordance with the invention and containing by weight 12.0% $MoO_3$, 6.0% $V_2O_5$ and 2.4% $P_2O_5$ supported on aluminum phosphate in the cristobalite form.

Several batches of aluminum phosphate were prepared from an activated alumina sold under the trade designation Actal A (Laporte Industries Ltd.) and having a B.S.S. mesh analysis of 40-150 mesh — 70 70percent, 150-200 mesh —30 percent. To 204 g. of this alumina was added a mixture of 249 ml. of phosphoric acid (S.G. 1.75 and containing 88% w/w $H_3PO_4$) and 60 ml. of water. After the initial vigorous reaction had subsided, the pasty mixture was heated at 220° C for 16 hours, the resulting mass broken up and then heated at 1,220° C for 16 hours. By X-ray powder diffraction analysis the product aluminum phosphate was shown to be in the cristobalite form and to contain less than 5 percent by weight of alpha alumina. The product was finally ground to a particle size of 44-150 B.S.S. mesh.

A solution of the catalyst component was prepared by dissolving 382.4 gms. of molybdic acid (85% w/w $MoO_3$) in a hot solution of 600 gms. of oxalic acid in 1500 mls. of water and to the resulting solution adding over a period of 30 minutes 120 gms. of vanadium pentoxide followed by 75.3 gms. of phosphoric acid (88% w/w $H_3PO_4$).

The solution of the catalyst components prepared in the above manner was added to 1,592 gms. of the previously prepared cristobalite aluminum phosphate. After heating to dryness, the mass was broken up and heated at 500° C for 16 hours and then ground to B.S.S. Mesh size of 44–150 mesh.

The resulting supported catalyst containing by weight 12.0 $MoO_3$, 6.0% $V_2O_5$ and 2.4% $P_2O_5$ and is hereinafter referred to as catalyst A. By krypton absorption measurements the surface area of the supported catalyst was found to be 1.15 square meters per gram.

EXAMPLE 2

In this example a supported catalyst, designated catalyst B, was prepared containing by weight 7.0% $MoO_3$. 12.6% $V_2O_5$ and 0.42% $P_2O_5$ supported on the cristobalite form of aluminum phosphate.

The cristobalite aluminum phosphate was prepared in a manner similar to that described in Example 1, except that an activated alumina of B.S.S. mesh size 150–200 mesh was employed. 204 g. of this alumina obtained by sieving the batch of alumina used in Example 1 were slurried with 250 mls. of water and then to the slurry was added 249 mls. of phosphoric acid (S.G. 1.75 and containing 88% w/w $H_3PO_4$). The resulting mixture was then treated as in Example 1 to give an aluminum phosphate of B.S.S. mesh size 44–150 mesh. X-ray powder diffraction analysis showed the aluminum phosphate to be in the cristobalite form and to be free of any detectable alumina impurity.

In the same manner as described in Example 1, an aqueous solution containing the appropriate amounts of $MoO_3$, $V_2O_5$ and $P_2O_5$ was prepared. The solution was added to the appropriate amount of the cristobalite aluminum phosphate prepared as described above to give, after treatment as specified in Example 1, a supported catalyst containing by weight 7.0% $MoO_3$, 12.6% $V_2O_5$ and 0.42% $P_2O_5$. This supported catalyst B was of mesh size 44–150 mesh.

EXAMPLE 3

For comparative purposes, a catalyst, designated catalyst C, was prepared in which the support was aluminum phosphate in the berlinite form. As for catalyst A, catalyst C contained by weight 12.0% $MoO_3$, 6.0% $V_2O_5$ and 2.4% $P_2O_5$.

Catalyst C was prepared in precisely the same manner as catalyst A except that the aluminum phosphate after preparation was heated for 16 hours at 800° C and not 1,200° C as was employed for catalyst A. X-ray powder diffraction analysis showed the resulting aluminum phosphate to be in the berlinite form. This aluminum phosphate was ground and then impregnated with the catalyst components as described in Example 1, the impregnated support being finally heated for 16 hours at 500° C and then ground to a B.S.S. mesh size of 44–150 mesh.

The surface area of the supported catalyst by krypton absorption measurements was 2,99 square meters per gram.

EXAMPLE 4

This example illustrates the use in the preparation of maleic anhydride of a catalyst supported on the cristobalite form of aluminum phosphate (catalyst A) as compared with a catalyst supported on the berlinite form of aluminum phosphate (catalyst C). Catalysts A and C were those prepared in Examples 1 and 3.

The reactor employed in this, and in subsequent examples, was an electrically heated tube of internal diameter 5 cm. and length 120 cm. supported in a vertical position. For each run the reactor was charged with the specified catalyst to a bed height of approximately 40 cm.

A gaseous mixture of benzene and air of specified composition was preheated to a temperature of 120° to 150° C and fed to the charged reactor at a rate sufficient to fluidize the supported catalyst and maintain the catalyst in a fluidized condition throught the run. Following reaction at the stated temperature, the maleic anhydride obtained was separated from the product gases by scrubbing the gases with refluxing benzene. The maleic anhydride separated in this way was determined in known manner while the proportion of benzene converted to oxidation products was determined by calculating the benzene balance for the system.

One method of calculating the yield of maleic anhydride base on the benzene converted to oxidation products is to assume that maleic anhydride and carbon dioxide are the only products. This, however, is a simplification of the actual system, in which many reactions take place. Thus, carbon monoxide is obtained in addition to carbon dioxide. A more accurate calculation of the yield of maleic anhydride may be obtained by assuming a perfect carbon balance with maleic anhydride and carbon oxides being the only carbonaceous products. Thus, for every $x$ moles of maleic anhydride produced $2x$ moles of carbon oxides are produced. A further $y$ moles of benzene are totally oxidized to carbon oxides ($6y$ moles). The quantities $x$ and ($2x$ and $6y$) are measured and the yield of maleic anhydride on the benzene oxidized is $x/(x+y) \times 100$.

The yields of maleic anhydride quoted in this and later examples have been calculated in this manner.

The results obtained in this example are shown in Table I. Comparisons of Runs 1 and 2 show that where the aluminum phosphate support is in the cristobalite form, a much higher yield of maleic anhydride is obtained than where the support is in the berlinite form.

TABLE I

SUPPORTED CATALYST

| Run No. | Ref Letter | AlPO₄ Support | Weight % of catalyst components | | | Surface area M²/g |
|---|---|---|---|---|---|---|
| | | | $MoO_3$ | $V_2O_5$ | $P_2O_5$ | |
| 1 | C | Berlinite | 12.0 | 6.0 | 2.4 | 2.99 |
| 2 | A | Cristobalite | 12.0 | 6.0 | 2.4 | 1.15 |

| Run No. | Benzene in gaseous mixture of benzene and air % v/v | Reaction Temp. °C | Contact time seconds |
|---|---|---|---|
| 1 | 9.1 | 355 | 5.2 |
| 2 | 9.1 | 385 | 5.1 |

| Run No. | Molar % of benzene converted to oxidation products | Yield of maleic anhydride molar % | Output of maleic anhydride. g/liter of catalyst/hr. |
|---|---|---|---|
| 1 | 16.9 | 17.2 | 5.6 |
| 2 | 17.5 | 70.0 | 23.4 |

EXAMPLE 5

In this example maleic anhydride preparations were carried out under a variety of conditions using a supported catalyst in which the support was aluminum phosphate in the cristobalite form. The supported catalysts A and B prepared as described in Examples 1 and 2.

The maleic anhydride preparations were carried out as described in Example 4 and the results are given in Table 2.

In runs 5 to 7 catalyst A was used with a gaseous mixture of benzene and air containing 9.1% v/v benzene and at reaction temperatures of from 409° to 440° C. In runs 8 to 10 catalyst B was used with a gaseous mixture containing 9.1% v/v benzene in air and at reaction temperature of from 375° to 440° C. With increasing temperature it will be seen that the conversion rises but yield of maleic anhydride falls somewhat.

Runs 10 to 13 illustrate the use of a gaseous mixture containing various proportions of benzene and air.

TABLE 2

| Run No. | Reference letter | Supported Catalyst Weight % of catalyst components | | |
|---|---|---|---|---|
| | | $MoO_3$ | $V_2O_5$ | $P_2O_5$ |
| 5 | A | 12.0 | 6.0 | 2.4 |
| 6 | A | 12.0 | 6.0 | 2.4 |
| 7 | A | 12.0 | 6.0 | 2.4 |
| 8 | B | 7.0 | 12.6 | 0.4 |
| 9 | B | 7.0 | 12.6 | 0.4 |
| 10 | B | 7.0 | 12.6 | 0.4 |
| 11 | B | 7.0 | 12.6 | 0.4 |
| 12 | B | 7.0 | 12.6 | 0.4 |
| 13 | B | 7.0 | 12.6 | 0.4 |

| Run No. | Benzene in gaseous mixture of benzene and air % v/v | Reaction Temp. °C | Contact time seconds |
|---|---|---|---|
| 5 | 9.1 | 409 | 4.2 |
| 6 | 9.1 | 416 | 4.2 |
| 7 | 9.1 | 440 | 4.0 |
| 8 | 9.1 | 375 | 4.3 |
| 9 | 9.1 | 390 | 4.2 |
| 10 | 9.1 | 440 | 4.2 |
| 11 | 7.0 | 438 | 4.3 |
| 12 | 12.0 | 410 | 4.1 |
| 13 | 1.5 (air rich mixture) | 412 | 4.1 |

| Run No. | Molar % of benzene converted to oxidation products | Yield of maleic anhydride Molar % | Output of maleic anhydride g/liter of catalyst/hr. |
|---|---|---|---|
| 5 | 23.1 | 66.4 | 29.5 |
| 6 | 27.3 | 64.3 | 32.6 |
| 7 | 33.1 | 63.8 | 40.7 |

| | | | |
|---|---|---|---|
| 8 | 10.5 | 71.0 | 14.1 |
| 9 | 17.9 | 69.8 | 23.6 |
| 10 | 31.5 | 62.3 | 37.1 |
| 11 | 39.0 | 64.3 | 35.2 |
| 12 | 20.7 | 66.0 | 35.0 |
| 13 | 72.6 | 51.6 | 11.6 |

EXAMPLE 6

A further series of supported catalysts, in which cristobalite aluminum phosphate was the support, were prepared in the same general manner as for Examples 1 and 2. The following gave satisfactory results in the preparation of maleic anhydride by the vapor phase oxidation of benzene.

| Catalyst Component | Weight % of catalyst component in the supported catalyst | | | | | |
|---|---|---|---|---|---|---|
| $MoO_3$ | 6.0 | 6.0 | 12.0 | 18.0 | 8.5 | 7.0 |
| $V_2O_5$ | 3.0 | 3.0 | 6.0 | 9.0 | — | 12.6 |
| $P_2O_5$ | 1.8 | 1.2 | 2.4 | 3.6 | 1.7 | 0.4 |

| Catalyst Component | Weight % of catalyst component in the supported catalyst | | | | | |
|---|---|---|---|---|---|---|
| $MoO_3$ | — | — | 6.0 | 9.0 | 3.0 | 2.5 | 6.0 |
| $V_2O_5$ | 14.0 | 7.0 | 3.0 | 4.5 | 1.5 | 6.5 | 3.0 |
| $P_2O_5$ | 6.0 | 3.0 | — | 1.8 | 0.6 | 1.2 | 0.6 |

We claim:

1. In a process for the vapor phase oxidation of benzene to maleic anhydride in which a gaseous mixture comprising benzene and oxygen is contacted at an elevated temperature with a supported catalyst whose catalyst component comprises two or more of vanadium oxide, molybdenum oxide, tungsten oxide and phosphorus oxide, the improvement wherein the support comprises at least 90 percent by weight of aluminum phosphate in the cristobalite form.

2. A process as claimed in claim 1 in which the catalyst component comprises molybdenum oxide and vanadium oxide in the weight ratio of from 1:3 to 4:1 respectively.

3. A process as claimed in claim 2 in which the catalyst component comprises molybdenum oxide and vanadium oxide in the weight ratio of about 2:1.

4. A process as claimed in claim 1 in which the catalyst component comprises molybdenum oxide and vanadium oxide with phosphorus oxide such that the weight ratio of the sum of molybdenum oxide and vanadium oxide to phosphorus oxide is greater than 1:1.

5. A process as claimed in claim 4 in which the said weight ratio is in the range of from 2:1 to 50:1.

6. A process as claimed in claim 1 in which the weight of the catalyst component is between 5 and 30 percent of the weight of the supported catalyst.

7. A process as claimed in claim 6 in which the weight of the catalyst component is between 10 and 20 percent of the weight of the supported catalyst.

8. A process as claimed in claim 1 in which the said gaseous mixture also contains one or more diluent gases.

9. A process as claimed in claim 8 in which the said gaseous mixture comprises benzene and air.

10. A process as claimed in claim 1 in which the said elevated temperatures is within the range of from 350° to 450° C.

* * * * *